Oct. 4, 1955             P. O. LESESNE             2,719,400
LAWN EDGING AND TRIMMING ATTACHMENT FOR POWER MOWERS
Filed April 7, 1952             2 Sheets-Sheet 1
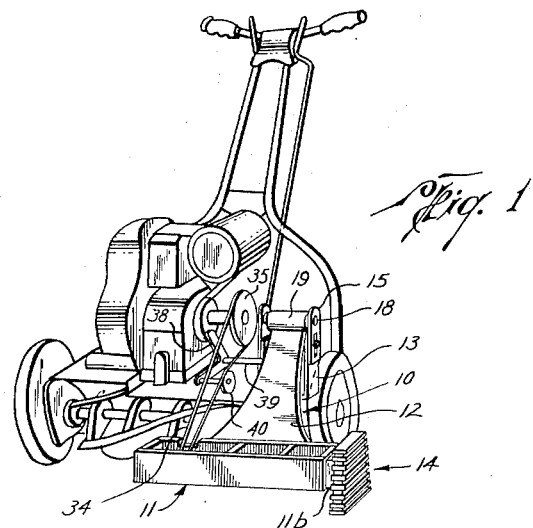
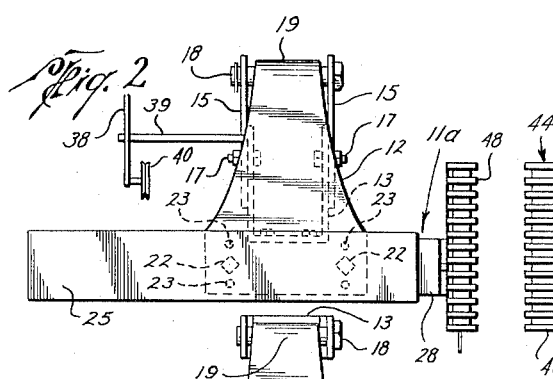
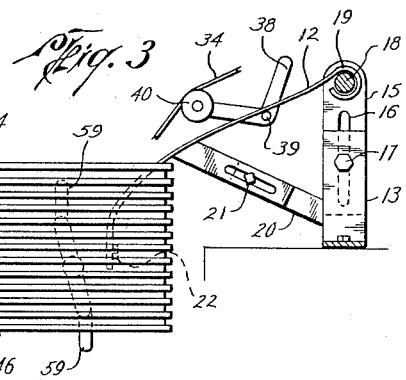
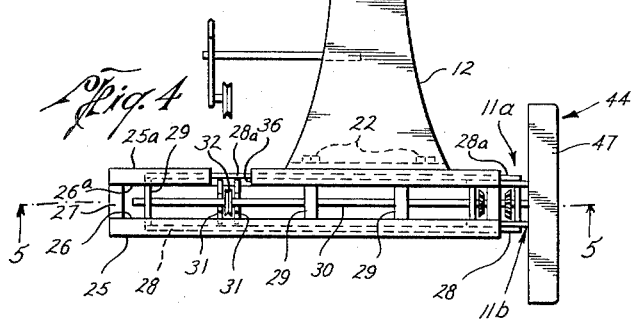
Purl O. Lesesne
INVENTOR.
BY
ATTORNEY Oct. 4, 1955 P. O. LESESNE 2,719,400
LAWN EDGING AND TRIMMING ATTACHMENT FOR POWER MOWERS
Filed April 7, 1952 2 Sheets-Sheet 2
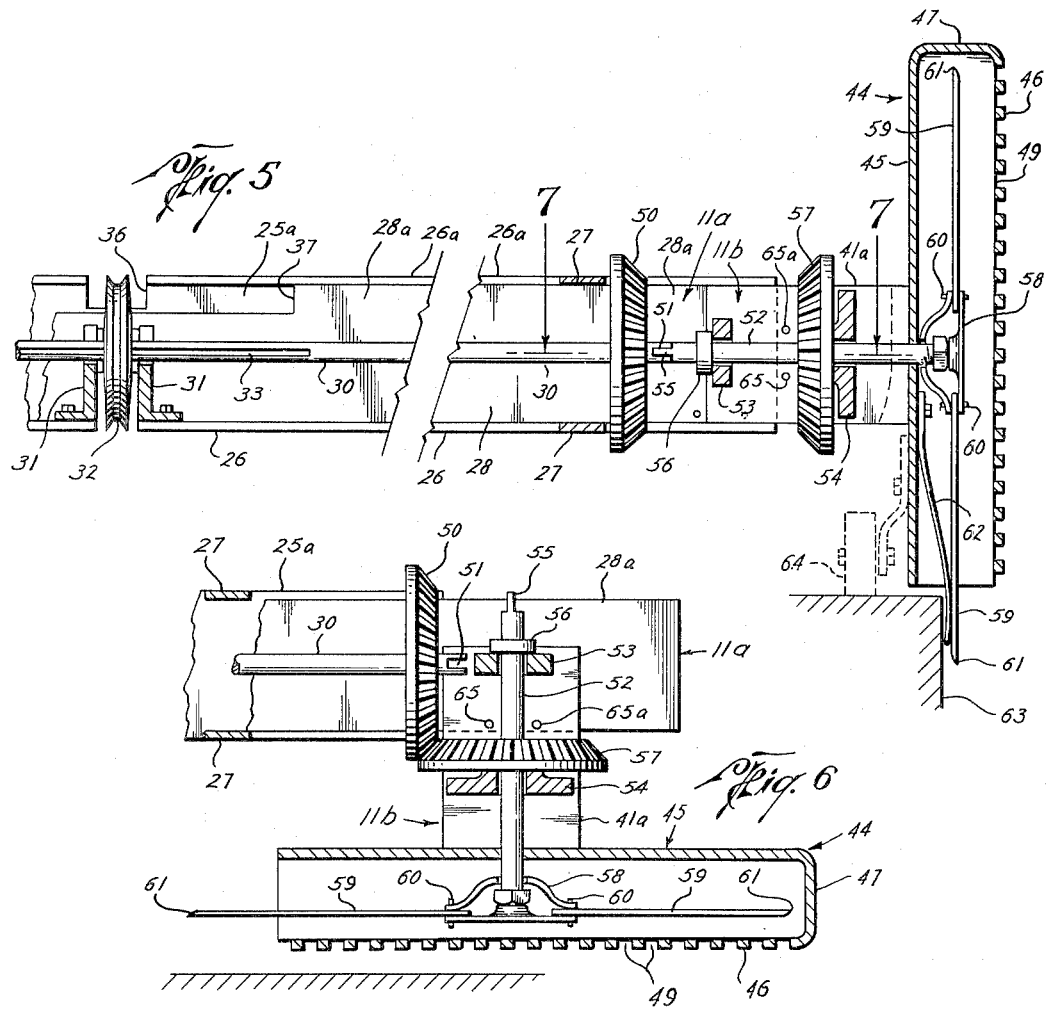
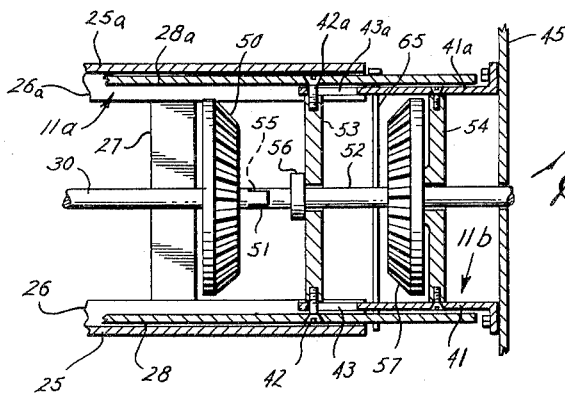
Purl O. Lesesne
INVENTOR.
BY
ATTORNEY

2,719,400

LAWN EDGING AND TRIMMING ATTACHMENT FOR POWER MOWERS

Purl O. Lesesne, Bellaire, Tex.

Application April 7, 1952, Serial No. 280,931

1 Claim. (Cl. 56—256)

This invention relates to lawn mowers and more particularly to an attachment therefor for trimming and cutting edges and lawn portions ordinarily inaccessible to the usual mower blades.

Conventional lawn mowers, whether of the hand or power driven types, are generally incapable of trimming grass or the lawn edges closely about trees, buildings or flower beds, or along curbs or walks. Numerous attachments have been devised which employ auxiliary cutting devices to cut or trim the grass at points which are not accessible to the main cutting blades of the mower. However, the attachments heretofore devised, are capable of cutting in only one position, that is, either in the horizontal position to reach grass closely adjacent to solid objects such as trees or buildings which cannot be reached by the main blade, or in the vertical position for trimming the edges of a lawn along walks, curbs, and the like. The present invention contemplates an attachment employing a single cutting head which will operate in either position, as desired.

Accordingly, a primary object of this invention is to provide an attachment for conventional power mowers, which is adapted to be selectivelly positioned in horizontal or vertical cutting position.

Another object is to provide such an attachment which is readily attachable to and removable from the mower.

A further object is to provide a mower attachment having a single cutting head which can be selectively disposed in the horizontal or vertical cutting positions without removing the cutting head from the attachment.

An additional object is to provide a mower attachment for power mowers having a single cutting head selectively disposable in horizontal or vertical cutting positions and driven from the power unit of the mower.

Still another object is to provide a combination cutting and trimming attachment having a cutting head mounted on a drive shaft which is provided with a hinge to permit shifting of the cutting head between vertical and horizontal cutting positions and having means for adjustably extending the shaft to move the cutting head laterally relative to the cutter.

A more specific object is to provide a mower attachment of the character described wherein the cutting head shaft is mounted in a sectional frame, the shaft having a joint therein, whereby a portion of the shaft and a section of the frame supporting said portion may be turned at right angles to the other section of the frame and the other portion of the shaft without removing any portion of the attachment from the mower.

Other and more specific objects and advantages of this invention will become more readily apparent from the following detailed description when read in conjunction with the accompanying drawings which illustrate one useful embodiment in accordance with this invention.

In the drawings:

Fig. 1 is a perspective view showing an attachment in accordance with this invention mounted on a power lawn mower of generally conventional design which is shown in broken lines;

Fig. 2 is an enlarged front elevational view of the attachment.

Fig. 3 is an enlarged side elevational view of the attachment;

Fig. 4 is an enlarged top plan view of the attachment;

Fig. 5 is a longitudinal sectional view through the shaft-supporting frame and cutter head, taken along line 5—5 of Fig. 4, showing the latter in its vertical cutting position;

Fig. 6 is a view generally similar to Fig. 5 but showing the cutting head in horizontal cutting position; and Fig. 7 is a top view, partly in section, of the hinged portion of the cutter shaft and frame taken along line 7—7 of Fig. 5.

Referring to the drawings, the attachment in accordance with this invention, designated generally by the numeral 10, is shown in Fig. 1 attached to the forward portion of a power mower of any generally conventional design, the mower being shown in broken lines since its details do not form a part of this invention. Attachment 10 includes an elongated generally box-like outer frame, designated generally by the numeral 11, which is adapted to be disposed in front of, and generally parallel to, the front of the mower. Outer frame 11 is mounted on one end of a broad upwardly curved arm 12 which is adapted to extend upwardly over the front of the mower and has its rearward end journalled in a U-shaped bracket 13 rigidly mounted on any convenient portion of the mower frame, generally at one side thereof as shown in Fig. 1. Outer frame 11 has telescopically mounted therein an inner frame, designated generally by the numeral 11a, and the latter has a sub-frame 11b extending telescopically into the right hand end thereof and hingedly connected thereto, as best seen in Figs. 5, 6 and 7. The outer end of sub-frame 11b carries a cutter head, designated generally by the numeral 14.

As best seen in Figs. 1, 2 and 3, the arms of bracket 13 carry extensions 15 which are provided with longitudinal slots 16 through which clamping bolts 17 extend from the bracket arms whereby to provide means for vertical adjustment of the extensions. A pin 18 extends between the upper ends of extension 15 and through a tubular journal 19 provided at the rearward end of arm 12 whereby arm 12 is pivotally supported on bracket 13. Pin 18 is removable from extension 15 and journal 19 and provides means for releasably connecting the attachment to the mower frame. Bracket 13 may be provided with a forwardly extending angle brace 20, the outer end of which is adapted to engage the lower face of arm 12 to limit its downward movement about pin 18 to thereby position the bottom of frame 11 at a suitable height above the lawn. Brace 20 is longitudinally adjustable by suitable means, such as the slot-and-bolt connection indicated at 21. The forward end of arm 12 is provided with studs 22 which are connectible to selected ones of the vertically spaced series of bolt holes 23, provided on the inner side of frame 11, as may best be seen in Figs. 2, 3 and 4. The several adjustable connections between the mower and frame 11, as formed by slots 16 and bolts 17, slot-and-bolt connection 21, and studs 22 and holes 23, provide means for adjusting the position of frame 11 so as to make it adaptable for attachment to mowers of widely varying sizes and heights.

Frame 11 includes an outer casing formed by a pair of parallel side channel members 25, 25a disposed on edge with their respective edge flanges 26, 26a facing inwardly toward each other in spaced-apart relation. The ends of channel members 25, 25a are connected together in the desired spaced-apart relation by spacer bars 27. Slidably disposed along the inner faces of the webs of channel members 25 and 25a are a pair of side plates 28, 28a, respectively, connected together in spaced-apart relation by a plurality of longitudinally spaced spacer blocks 29, which together with side plates 28, 28a form the inner frame 11a, which is telescopically movable in outer frame 11. A shaft 30 is mounted longitudinally of inner frame 11a between side plates 28, 28A and is rotatively and slidably supported in spacer blocks 29. At a point spaced from its left-hand end, shaft 30 is supported in a pair of pillow blocks 31, 31a secured to flanges 26, 26a. A drive pulley 32 is mounted on shaft 30 between the pillow blocks and is keyed to shaft 30 which is provided with an elongated key slot 33 (Fig. 5) whereby the shaft may slide longitudinally through pulley 32, contemporaneously with the extension and retraction of the inner frame relative to the outer frame, while being locked to the pulley for rotation thereby. Pulley 32 is drivingly connected by means of a belt 34 to a power pulley 35 which may be the usual drive pulley which is conventionally driven by the power unit of the mower, as illustrated in Fig. 1. The upper edge of rear channel member 25 is appropriately notched, as at 36, for passage of the belt around pulley 32. The rear side plate 28 is cut away at 37 along its upper edge for the same purpose (Figs. 4 and 5). A crank 38, which is pivotally supported on arm 12 by means of a pivot pin 39, has mounted on one arm thereof an idler pulley 40 disposed in registration with belt 34 so that it may be moved into and out of tightening engagement with the belt by appropriate movement of crank 38. Movement of idler pulley 40 into engagement with belt 34 will effect driving engagement between power pulley 35 and drive pulley 32. Retraction of idler pulley 40 from engagement with the belt will effect release of this driving engagement.

Extending into the right-hand of inner frame 11a between side plates 28, 28a is sub-frame 11b, which is composed of a pair of side plates 41, 41a arranged parallel and contiguous to the inner faces of side plates 28, 28a. The inner ends of side plates 41, 41a are pivotally connected to side plates 28, 28a by suitable trunnion members 42, 42a (Fig. 7), which extend from side plates 28, 28a through longitudinally elongated slots 43, 43a in side plates 41, 41a, respectively. With this arrangement, it will be seen that sub-frame 11b is longitudinally movable to a limited extent relative to side plates 28, 28a and movable with inner frame 11a into and out of outer frame 11 and that it is also rotatable about trunnion members 42, 42a between the outer ends of plates 28, 28a. Bolts 65, 65a, which extend transversely through side plates 28, 28a and side plates 41, 41a, serve as means for releasably locking sub-frame 11b to inner frame 11a in either coaxially or angularly disposed relation as will subsequently be described.

The outer ends of side plate 41, 41a are rigidly secured to a casing, designated generally by the numeral 44, which form a part of cutter head 14. Casing 44 is of generally flat rectangular form composed of parallel, spaced-apart inner and outer walls 45 and 46, respectively, the space between walls 45 and 46 being closed at the top by a top wall 47 and open at the bottom. The opposite ends of casing 44 are closed by horizontally slotted end walls 48, 48a and outer side wall 46 is provided with a series of horizontal slots 49, whereby to form spaces for the admission of grass into the interior of casing 44 when the latter is in horizontal position, for purposes to be subsequently described.

Spaced slightly from the right-hand end of shaft 30, a bevel gear 50 is mounted on shaft 30 for rotation thereby. The right-hand end of shaft 30 is provided with a transverse slot 51. A stub shaft 52 is rotatably mounted in sub-frame 11b in axial alignment with shaft 30 when sub-frame 11b is co-axially disposed in the end of inner frame 11a (Fig. 5). Stub shaft 52 is journalled in bearings 53 and 54 and its left-hand end is provided with a flat tongue 55 which is insertable in slot 51 of shaft 30 when the stub shaft is in axial alignment with shaft 30, as seen in Fig. 5, whereby stub shaft 52 may be rotatively driven by shaft 30. A locking collar 56 is mounted on stub shaft 52 to the left of bearing 53 to limit the outward movement of stub shaft 52. A bevel gear 57 is mounted on stub shaft 52 between bearings 53 and 54 for rotation with the stub shaft. The right-hand end of stub shaft 52 extends into the interior of casing 44 and has mounted thereon for rotation therewith a yoke 58, which extends generally symmetrically on opposite sides of stub shaft 52. A pair of narrow elongated cutter blades 59 each has one end pivotally mounted in an end of yoke 58 by means of a pivot pin 60, the outer ends and the leading edges of the blades being sharpened to form cutting edges 61. The described arrangement of the cutter blades is such that the blades will be advanced to cutting position by centrifugal force developed through rotation of yoke 58 by stub shaft 52. The pivoted connection of the blades to the yoke will allow the blades to yield when they strike a strongly resistant object in their cutting path. As will be seen in Figs. 5 and 6, the open end portion of casing 44 is made somewhat shorter than the closed portion, so that the outer ends of blades 59 will project through the open end of the casing in their path of travel. Casing 44 serves also as a guard for the portions of blades 59 within the casing. As seen in Fig. 5, a single stationary blade 62 may, if desired (although it is not essential), be rigidly secured at one end to the inner face of inner wall 45, the other end projecting from the open end of the casing parallel to and closely adjacent the plane of travel of blades 59 to thereby obtain a scissors action between moving blades 59 and stationary blade 62 on grass encountered by the cutter head. Stationary blade 62 may also serve as a guide for the cutter head when the latter is in the vertical position shown in Fig. 5 employed for cutting the edges of a lawn along curbs, walks and the like, indicated at 63 in Fig. 5. The projecting end of stationary blade 62 also serves to maintain cutter blades 59 laterally spaced from such curbs or walks to prevent the rotating blades from striking such objects. A guide and support roller 64, shown in broken lines in Fig. 5, may, if desired, be mounted on the outer face of inner wall 45 to assist in guiding and rollably supporting the cutter head.

The above described device operates in the following manner: Attachment 10 will be connected to a power mower in the manner previously described and as illustrated in Fig. 1, power from power pulley 35 will be transmitted to drive pulley 32 by moving idler pulley 40 into tightening engagement with belt 34 to thereby rotate shaft 30. It will first be assumed that it is desired to use the attachment for edging a lawn, as along curbs, sidewalks or the like. Cutter head 14 will be positioned in the vertical position shown in Fig. 1. In this position sub-frame 11b will be locked in the horizontal position in inner frame 11a. It will be understood that arm 12 will be supported, as by angle brace 20, in such position that the open bottom of casing 44 will be slightly elevated above the surface of the lawn so that the attachment may be readily moved over the lawn by the movement of the mower. With the present invention a lawn may be edged either by running the mower over the lawn and running the cutter head inside the line of the curb or side walk, or the mower may be run on the sidewalk or on the side of the curb opposite the edge of the lawn and the cutter head extended over the edge of the side walk or curb, as shown particularly in Fig. 5. If the first-mentioned operation is to be employed, sub-frame 11b and inner frame 11a will be moved in the left-hand direction to the fully retracted position. In the second case, inner frame 11a and sub-frame 11b will be pulled out of the outer frame to any desired extent required to reach the line to be edged. In either of these positions the driving connection between shaft 30 and stub shaft 52 will be the tongue-and-slot connection 55, 51, the bevel gears 50, 57 being non-operative in these positions. As the mower and the attachment are moved along the line to be edged, cutter blades 59 will be rotated in a vertical plane and will effectively trim the edge of the lawn. The pivoted connection of the blades to yoke 58 will allow the blades to fold back if they strike an object such as a root which is strongly resistant to cutting. However, the blades will strike repeated blows on such an object and the centrifugal force of rotation will usually cause the blades to cut through such an object. Ordinary grass will, of course, be cut readily by the blades.

When it is desired to trim grass about trees or buildings, cutter head 14 will be shifted to the horizontal position, shown in Fig. 6. This will be accomplished by withdrawing bolts 65 and rotating sub-frame 11b about trunnions 42 downwardly through an angle of 90° to place the cutter head in the horizontal position, as shown. Bevel gear 57 will be brought into meshing engagement with bevel gear 50, slots 43, 43a in which trunnions 42, 42a are inserted, being employed, if necessary, to move the sub-frame vertically to bring the gears into mesh. Bolts 65 will then be inserted through suitably positioned registering holes in side plates 28, 28a and side plates 41, 41a, to lock the sub-frame in the angular position. Rotation of shaft 30 will now be transmitted through bevel gears 50 and 57 to drive stub shaft 52 and its attached cutting blades. By moving inner frame 11a in or out of the outer frame, the lateral position of the cutter head relative to the mower may be adjusted as desired.

It will be understood that various changes and modifications may be made in the details of the illustrative embodiment within the scope of the appended claim without departing from the spirit of this invention.

What I claim and desire to secure by Letters Patent is:

A lawn edging and trimming device comprising an elongated outer frame adapted to be attached to a mobile mower, an inner frame slidably mounted in said elongated frame, said inner frame having opposed sides, a sub-frame adjustably pivotally mounted between said opposed sides, a power shaft extending longitudinally of said inner and sub-frames and extending past said pivotal mounting between said inner frame and said sub-frame, said shaft being journalled in said inner and said sub-frames, cutting blades mounted on said shaft beyond the outer end of said sub-frame, a pair of bevel gears fixed on said shaft with one such gear being on each side of said pivotal mounting, and said shaft having a separable connection between said gears, whereby said shaft is functionally longitudinally continuous while said sub-frame is aligned with said inner frame, and power is transmitted through said gears when said sub-frame is pivotally adjusted to a position at substantially a right angle to said inner frame.

References Cited in the file of this patent

UNITED STATES PATENTS

| | | |
|---|---|---|
| 1,189,519 | Word | July 4, 1916 |
| 2,435,192 | Arsneau | Feb. 3, 1948 |
| 2,498,138 | Shepard et al. | Feb. 21, 1950 |
| 2,521,033 | Bell | Sept. 5, 1950 |
| 2,524,466 | Moss et al. | Oct. 3, 1950 |
| 2,574,725 | Berdan | Nov. 13, 1951 |
| 2,596,641 | Bert et al. | May 13, 1952 |
| 2,602,277 | Johnson | July 8, 1952 |
| 2,608,043 | Berdan | Aug. 26, 1952 |
| 2,618,919 | Hutchens | Nov. 25, 1952 |
| 2,632,990 | Stricklen et al. | Mar. 31, 1953 |